(12) United States Patent
Yao et al.

(10) Patent No.: US 7,843,666 B2
(45) Date of Patent: Nov. 30, 2010

(54) SUSPENSION, HEAD GIMBAL ASSEMBLY AND MANUFACTURING METHOD THEREOF, AND DISK DRIVE UNIT WITH THE SAME

(75) Inventors: MingGao Yao, Dongguan (CN); YiRu Xie, Dongguan (CN); Yu Sun, Dongguan (CN); Lin Guo, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 868 days.

(21) Appl. No.: 11/790,564

(22) Filed: Apr. 26, 2007

(65) Prior Publication Data
US 2008/0266713 A1 Oct. 30, 2008

(51) Int. Cl.
G11B 5/48 (2006.01)
(52) U.S. Cl. .................................................. 360/245.3
(58) Field of Classification Search ............... 360/245.3
See application file for complete search history.

(56) References Cited
U.S. PATENT DOCUMENTS

| | | | | |
|---|---|---|---|---|
| 5,652,684 A * | 7/1997 | Harrison et al. | .......... | 360/245.1 |
| 6,400,532 B1 * | 6/2002 | Mei | .......... | 360/245.1 |
| 6,757,137 B1 * | 6/2004 | Mei | .......... | 360/245.7 |
| 7,006,333 B1 * | 2/2006 | Summers | .......... | 360/294.4 |
| 7,307,817 B1 * | 12/2007 | Mei | .......... | 360/245.7 |
| 7,554,773 B2 * | 6/2009 | Zhu et al. | .......... | 360/294.4 |
| 2003/0168935 A1 | 9/2003 | Ogawa et al. | | |

* cited by examiner

*Primary Examiner*—Mark Blouin
(74) *Attorney, Agent, or Firm*—Nixon & Vanderhye, P.C.

(57) ABSTRACT

A suspension for a HGA includes a suspension flexure and an out rigger. The suspension flexure has a tongue region having a first flexure part in a tip portion thereof for mounting a trailing edge of a slider and a PZT mounting region for mounting PZT elements. One end of the out rigger is connected to the suspension flexure, and the other end of the out rigger has a rigger support portion which extends above the tongue region so as to support the leading edge of the slider. The structure of the out rigger is capable of stiffening the tongue region of the suspension flexure and, in turns, avoiding the deformation problem and the dimple separation problem during the manufacturing process or in vibration or shock events. The invention also discloses a HGA with the suspension, manufacturing methods of the HGA and a disk drive unit having such HGA.

24 Claims, 14 Drawing Sheets

SUSPENSION, HEAD GIMBAL ASSEMBLY AND MANUFACTURING METHOD THEREOF, AND DISK DRIVE UNIT WITH THE SAME

FIELD OF THE INVENTION

The present invention relates to an information recording disk drive unit, and more particularly to a suspension for a head gimbal assembly (HGA) with a micro-actuator, a HGA and its manufacturing method, and disk drive unit with the same.

BACKGROUND OF THE INVENTION

Disk drives are information storage devices that use magnetic media to store data and a movable read/write head positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Such PZT elements have been disclosed in various open literatures, for example, U.S. Patent NO. 2003-0168935, entitled "Piezoelectric Driving Device".

FIG. 1a shows a magnetic disk 101 mounted on a spindle motor 102 for spinning the disk 101. A voice coil motor arm 104 carries a HGA 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by a suspension of the HGA 100 such that a predetermined flying height above the surface of the spinning disk 101 is maintained over full radial stroke of the motor arm 104.

Because of the inherent tolerances that exist in the placement of the slider 103 by a VCM alone, the slider 103 cannot achieve quick and fine position control, which adversely impacts the ability of the read/write head to accurately read data from and write data to the disk. As a result, a PZT micro-actuator 105, as described above, is provided in order to improve the position control of the slider 103 and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks per inch" (TPI) value by 50% for the disk drive unit, as well as provide an advantageous reduction in the head seeking and settling time. Thus, the PZT micro-actuator 105 enables the disk drive unit to have a significant increase in the surface recording density of the information storage disks used therein.

Referring to FIGS. 1b-1c, the HGA 100 includes the slider 103, a pair of thin film PZT elements 10 for fine positional adjustments of the slider 103, and a suspension to support the slider 103 and the PZT elements 10. The suspension comprises a flexure 122, a slider support 121, a metal base 123, and a load beam 124.

As shown in FIGS. 1b-1c, the slider 103 is partially mounted on the slider support 121 of the suspension, and a bump 127 formed on the slider support 121 supports the center of the back surface of the slider 103. The flexure 122 with a plurality of traces couples the slider support 121 and the metal base 123. The load beam 124 is provided under the slider support 121 and the metal base 123 to support both of them. The load beam 124 forms a dimple 125 thereon that works with the bump 127. When the slider 103 is flying on the disk, the dimple 125 supports the bump 127, which keeps the load force from the load beam 124 always evenly applying to the center of the slider 103, thus ensure the slider 103 a good fly performance, such as good fly posture. The flexure 122 provides a tongue region 128 thereof for positioning the PZT elements 10. The two PZT elements 10 are attached on the tongue region 128 of the flexure 122. With reference to FIG.

1c, when a voltage is input to the thin film PZT elements 10, one of the PZT elements 10 may contract as shown by arrow D, and the other one may expand as shown by arrow E. This will generate a rotation torque that causes the slider support 121 to rotate in the arrowed direction C and, in turn, makes the slider 103 move.

Since the slider 103 is partially mounted on the slider support 121 and the bump 127 of the slider support 121 supports the center of the slider 103, the slider 103 with the slider support 121 are easy to rotate against the dimple 125. The slider support 121 is coupled with the metal base 123 by the tongue region 128 of the flexure 122. Since the thickness of the tongue region 128 of the flexure 122 is only 10-20 um and is soft polymer material, the suspension is easy to deform in its tongue region 128 during the suspension manufacture process, the ultrasonic cleaning process or the HGA manufacture process, as well as a vibration or shock event. This will cause a dimple separation and seriously affect the HGA performance. FIG. 2a and FIG. 2b show a suspension tongue region deformation and a dimple separation respectively. Since the flexure 122 is easy to deform which easy causes the HGA dimple separation, and because the slider 103 is mounted on the top surface of the flexure 122, the static attitude of the slider 103 is difficult to control, which will seriously affect the HGA dynamic performance.

In addition, the shock performance of the full structure indicated above is very poor. When a vibration or shock event happens, the suspension or the PZT elements may be caused to damage, such as crack or broken.

Furthermore, because of the structure indicated above, the static angle in both pitch and roll direction are very poor. This will cause the HGA performance unstable and seriously affect the HGA dynamic performance, especially when a vibration or shock event happens during the manufacture process or handle process.

Hence, it is desired to provide an improved suspension, a HGA with a micro-actuator and its manufacturing method, and a disk drive unit with such HGA to solve the above-mentioned problems and achieve a good performance.

SUMMARY OF THE INVENTION

Accordingly, an object of the present invention is to provide a suspension for a HGA with improved structures capable of preventing suspension tongue region deformation and dimple separation during its manufacturing process or in vibration or shock events, thereby improving the shock performance of the HGA and the static and dynamic performance of the slider.

Another object of the present invention is to provide a HGA with a suspension which has improved structures capable of preventing suspension tongue region deformation and dimple separation during its manufacturing process or in vibration or shock events, thereby improving the shock performance of the HGA and the static and dynamic performance of the slider.

Still another object of the present invention is to provide a method for manufacturing a HGA to avoid the dimple separation, improve the shock performance of the HGA and the static and dynamic performance of the slider.

A further object of the present invention is to provide a disk drive unit having high static and dynamic performance and improved shock performance.

To achieve the above-mentioned objects, a suspension for a HGA comprises a suspension flexure and an out rigger. The suspension flexure has a tongue region having a first flexure part in a tip portion thereof adapted for mounting a trailing edge of a slider and a PZT mounting region adapted for mounting PZT elements. One end of the out rigger is connected to the suspension flexure, and the other end of the out rigger has a rigger support portion which extends above the tongue region so as to be adapted for supporting a leading edge of the slider.

The structure of the out rigger is capable of stiffening the tongue region of the suspension flexure and, in turns, avoiding the deformation problem and the dimple separation problem during the manufacturing process or in vibration or shock events.

In addition, as an improvement, the tongue region further has a neck portion coupling the first flexure part and the PZT mounting region so that the first flexure part is rotated against the neck portion. Between the neck portion and the rigger out support portion there is a second dimple to support the rigger support portion such that the rigger support portion is rotated against the second dimple.

The rigger support portion has a first support portion corresponding to the center portion of the slider, a second support portion corresponding to the leading edge of the slider, and a weak beam coupling the first support portion and the second support portion.

Furthermore, the first support portion further comprises a left arm and a right arm. A left beam extends from the left arm to connect to the suspension flexure, and a right beam extends from the right arm to connect to the suspension flexure.

In another embodiment of the suspension according to the present invention, the out rigger is integrally formed with the suspension flexure.

According to embodiments of the suspension of the present invention, the suspension further has a load beam which provides a first dimple. The first dimple works with the second dimple to keep the loading force always applying to the center of the slider. So a good resonance transfer function characteristic is achieved.

According to another embodiment of the suspension of the present invention, the first flexure part forms a step to keep a height difference between the first flexure part and the rigger support portion.

Preferably, the out rigger is metal material.

A HGA of the present invention comprises a slider having a leading edge and a trailing edge opposite the leading edge, a micro-actuator having PZT elements, and a suspension having a suspension flexure and an out rigger. The suspension flexure has a tongue region having a first flexure part in a tip portion thereof for mounting the trailing edge of the slider and a PZT mounting region for mounting PZT elements. One end of the out rigger is connected to the suspension flexure, and the other end of the out rigger has a rigger support portion which extends above the tongue region so as to support the leading edge of the slider.

A manufacturing method of a HGA according to the present invention comprises the steps of: 11) integrally forming a suspension flexure and an out rigger, the suspension flexure having a tongue region which has a first flexure part in a tip portion thereof and a PZT mounting region, the out rigger having one end extending above the tongue region; 12) mounting PZT elements to the PZT mounting region of the suspension flexure; 13) providing a slider which has a leading edge and a trailing edge opposite the leading edge and mounting the trailing edge of the slider to the first flexure part of the suspension flexure with the leading edge of the slider being supported by the out rigger.

Another manufacturing method of a HGA according to the present invention comprises the steps of: 21) providing a suspension flexure which has a tongue region, the tongue region having a first flexure part in a tip portion thereof and a PZT mounting region; 22) mounting PZT elements to the PZT mounting region of the suspension flexure; 23) providing an out rigger and connecting one end of the out rigger to the suspension flexure with the other end of the out rigger extending above the tongue region of the suspension flexure; 24) providing a slider which has a leading edge and a trailing edge opposite the leading edge and mounting the trailing edge of the slider to the first flexure part of the suspension flexure with the leading edge of the slider being supported by the out rigger.

A disk drive unit of the present invention comprises a head gimbal assembly, a drive arm to connect with the head gimbal assembly, a disk, and a spindle motor to spin the disk. The head gimbal assembly comprises a slider having a leading edge and a trailing edge opposite the leading edge, a micro-actuator with PZT elements, and a suspension having a suspension flexure and an out rigger. The suspension flexure has a tongue region having a first flexure part in a tip portion thereof for mounting the trailing edge of the slider and a PZT mounting region for mounting PZT elements. One end of the out rigger is connected to the suspension flexure, and the other end of the out rigger has a rigger support portion which extends above the tongue region so as to support the leading edge of the slider.

Other aspects, features, and advantages of this invention will become apparent from the following detailed description when taken in conjunction with the accompanying drawings, which are a part of this disclosure and illustrate, by way of example, principles of this invention.

BRIEF DESCRIPTION OF THE DRAWINGS

The accompanying drawings facilitate an understanding of the various embodiments of this invention. In such drawings:

FIG. 3b is an exploded, perspective view of the HGA shown in FIG. 3a;

FIG. 4a is a partially enlarged perspective view of the HGA of FIG. 3a;

FIG. 4b is a partial side elevational view of the HGA of FIG. 4a;

DETAILED DESCRIPTION OF ILLUSTRATED EMBODIMENTS

Figure 1A:
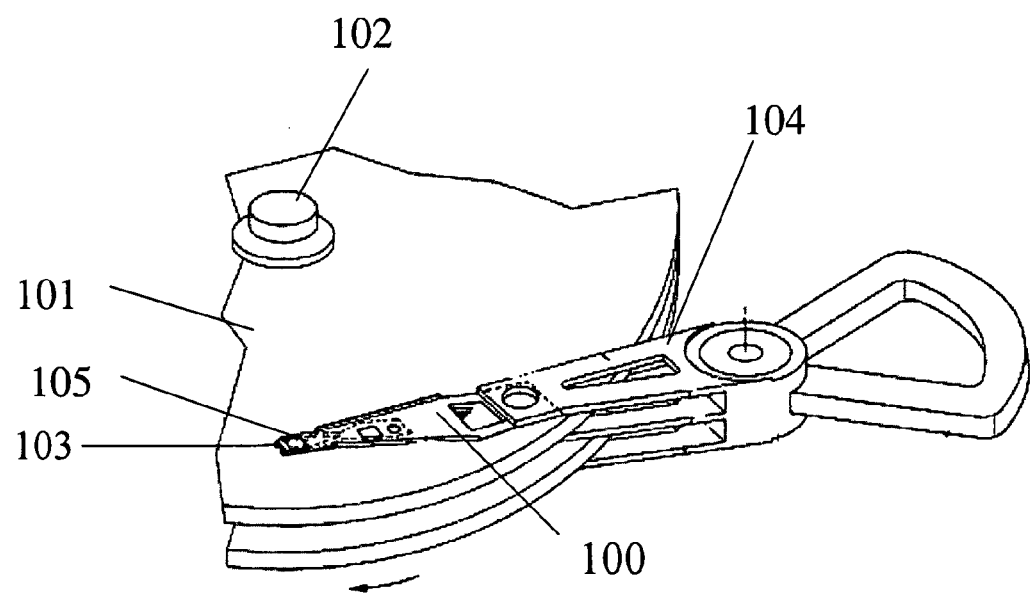
FIG. 1a is a partial perspective view of a conventional disk drive unit.
Figure 1B:
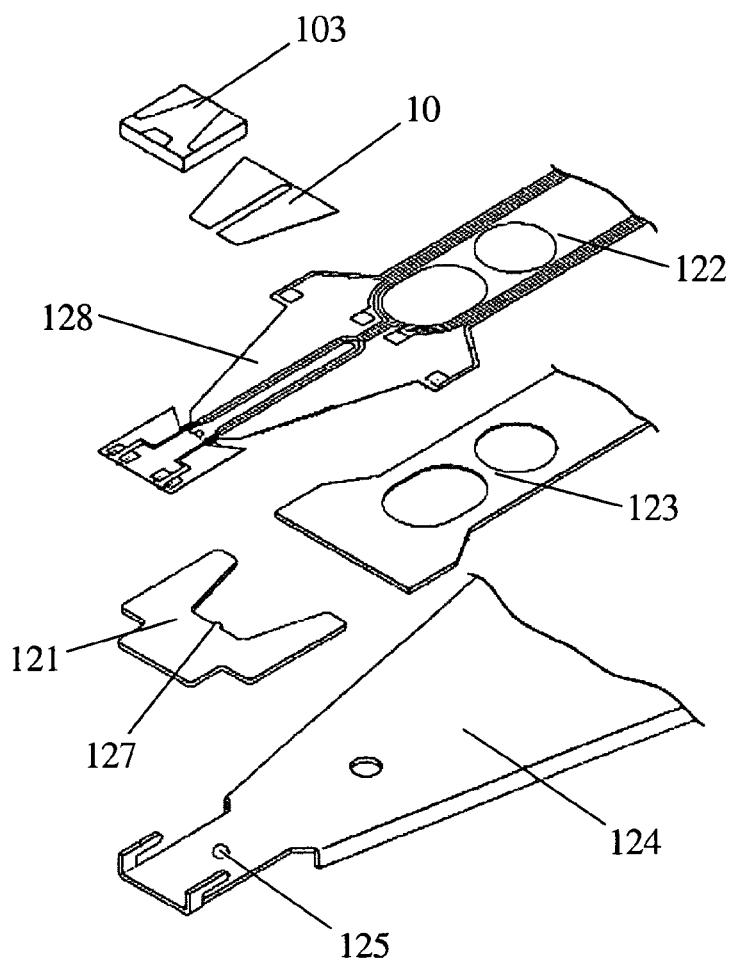
FIG. 1b is an exploded, perspective view of a conventional HGA.
Figure 1C:
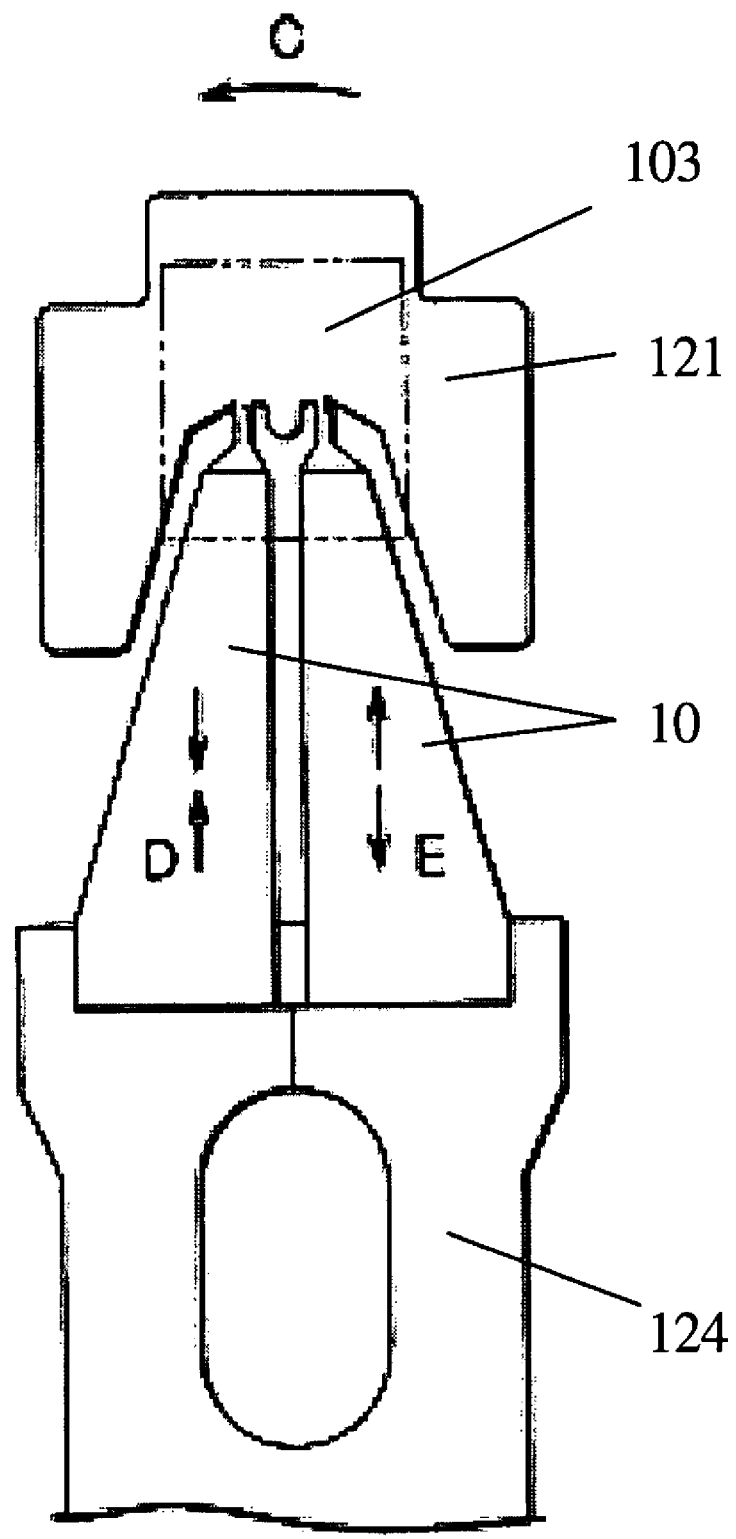
FIG. 1c a partial top plan view of the assembled HGA shown in FIG. 1b.
Figure 2A:
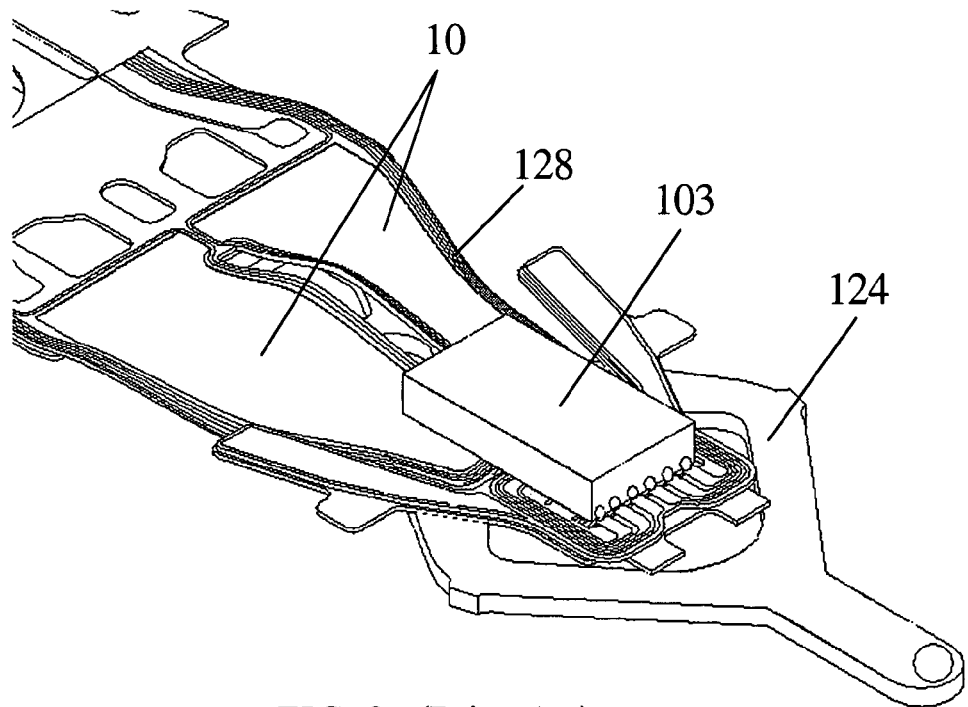
FIG. 2a is a diagrammatic view illustrating a suspension tongue region deformation problem of the conventional HGA.
Figure 2B:
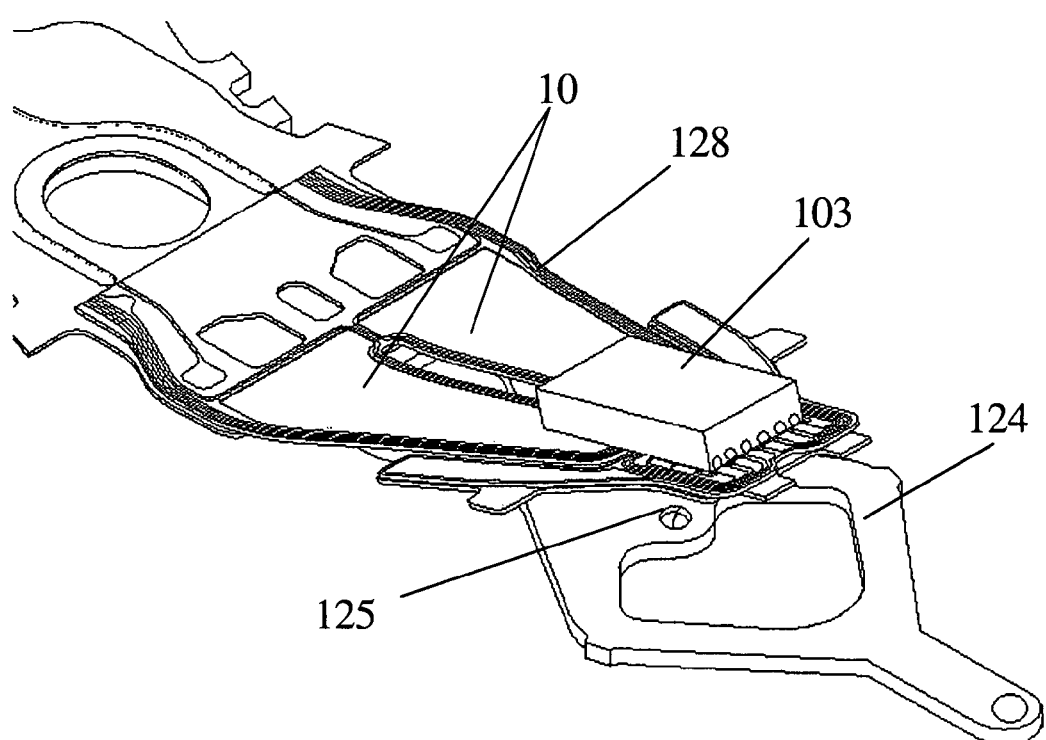
FIG. 2b is a diagrammatic view illustrating a dimple separation problem of the conventional HGA.

Various preferred embodiments of the invention will now be described with reference to the figures, wherein like reference numerals designate similar parts throughout the various views. As indicated above, the invention is directed to a suspension for a HGA including a suspension flexure and an out rigger. The suspension flexure has a tongue region having a first flexure part in a tip portion thereof for mounting a trailing edge of a slider and a PZT mounting region for mounting PZT elements. One end of the out rigger is connected to the suspension flexure, and the other end of the out rigger has a rigger support portion which extends above the tongue region for supporting a leading edge of the slider. The tongue region further has a neck portion coupling the first flexure part and the PZT mounting region so that the first flexure part is rotated against the neck portion. Between the neck portion and the rigger support portion there is a second dimple to support the rigger support portion such that the rigger support portion is rotated against the second dimple. The rigger support portion has a first support portion corresponding to a center portion of the slider, a second support portion corresponding to the leading edge of the slider, and a weak beam coupling the first and the second support portions.

Furthermore, the first support portion further includes a left arm and a right arm. A left beam extends from the left arm to connect to the suspension flexure, and a right beam extends from the right arm to connect to the suspension flexure.

Figure 3A:
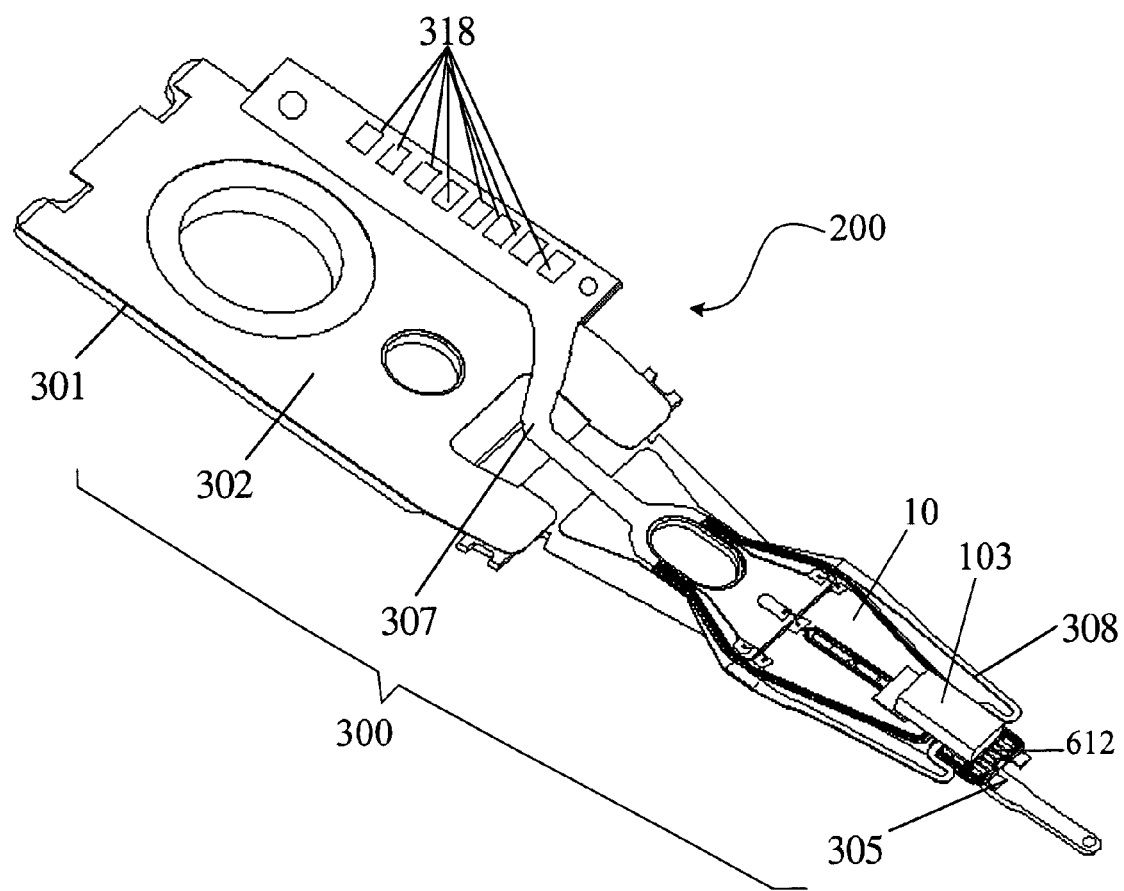
FIG. 3a is a perspective view of a HGA with a PZT micro-actuator according to an embodiment of the present invention.
Figure 3B:
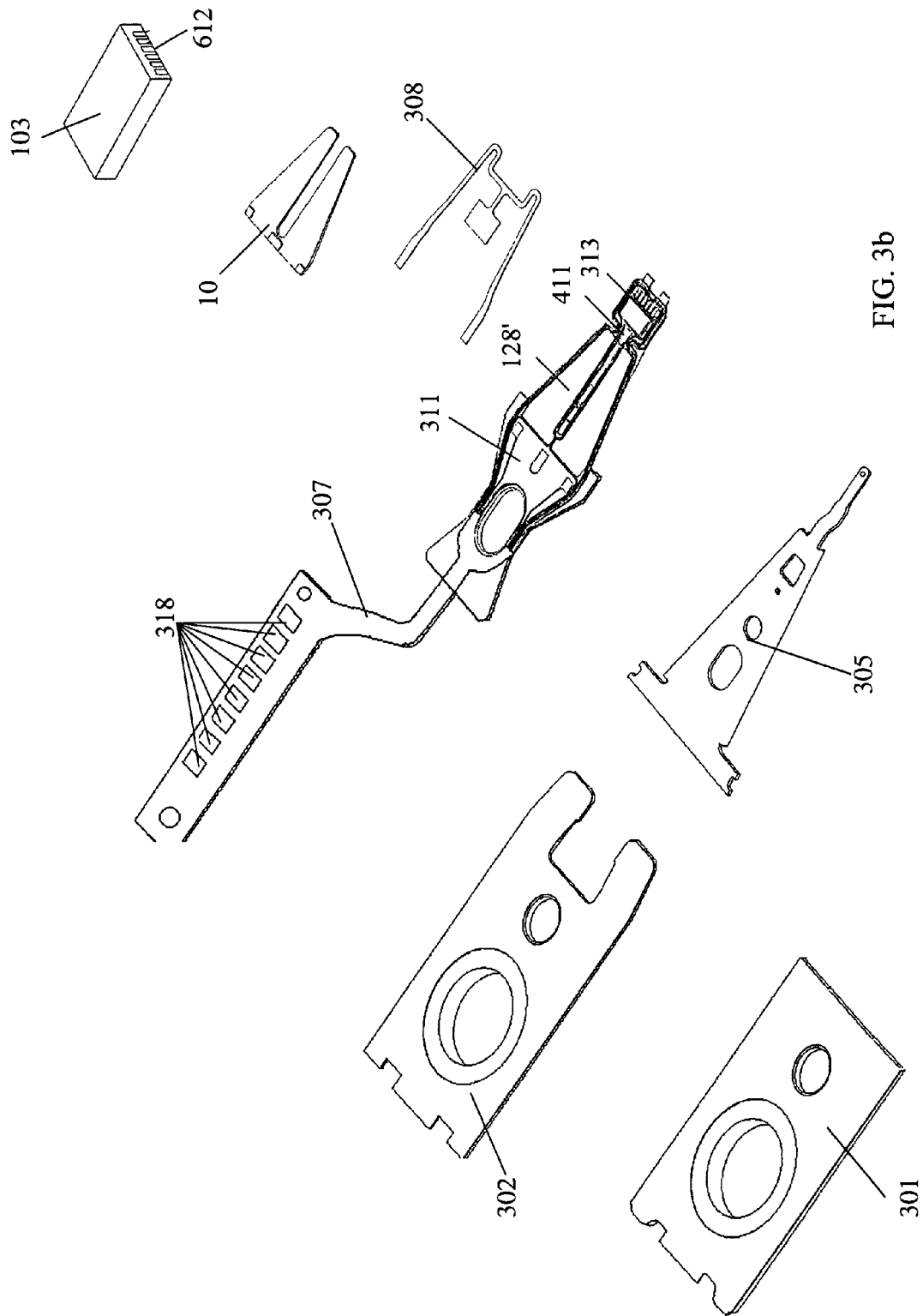

Several example embodiments of a HGA with the suspension will now be described. FIGS. 3a-3b illustrate a HGA 200 incorporating the present suspension according to an exemplary embodiment of the present invention. The HGA 200 includes a suspension 300, a slider 103, and a PZT micro-actuator 10. The suspension 300 includes a base plate 301, a load beam 305, a hinge 302, a flexure 307 with several suspension pads 318 thereon, and an out rigger 308, which are assembled together.

The hinge 302 is mounted onto the base plate 301 and the load beam 305, and the flexure 307 is mounted to the hinge 302 and the load beam 305. The flexure 307 provides a tongue region which includes a first flexure part 313 in a tip portion thereof, a main flexure body 311, and a PZT mounting region 128' between the first flexure part 313 and the main flexure body 311, which is soft polymer material layer with electrical traces laminated thereon. The electrical trace couples the slider pads 612 at one end and the other end couples the suspension pads 318. The PZT mounting region 128' connects the first flexure part 313 and the main flexure body 311. A pair of PZT elements 10 is mounted on the top surface of the PZT mounting region 128'. Between the first flexure part 313 and the PZT mounting region 128', there is a neck portion 411 so that the first flexure part 313 can be freely rotate against the neck portion 411. An out rigger 308 connects with the flexure 307 in two sides of the tongue region 128 by one end, and the other end partially supports the slider 103.

Figure 6:
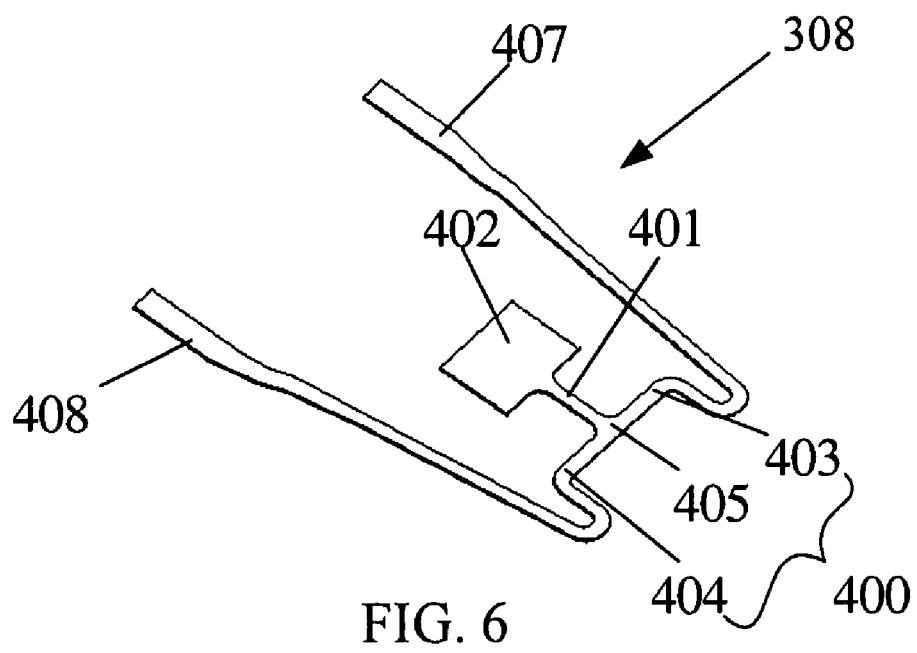
FIG. 6 is an enlarged perspective view of an out rigger for the HGA.

As shown in FIG. 6, the out rigger 308 has a rigger support portion and two beams 407, 408. The rigger support portion includes a first support portion 402 corresponding to a center portion of the slider 103, a second support portion 400 corresponding to the leading edge of the slider 103, and a weak beam 401 connecting the first and the second support portions 402, 400. The second support portion 400 has a left arm 403, a right arm 404, and a rotation region 405 at the cross of the left arm 403 and the right arm 404. As best shown in FIG. 4b, a second dimple 320 is formed beneath the rotation region 405. The left beam 407 extends from the left arm 403 and couples to the main flexure body 311 at a left side thereof. Similarly, the right beam 408 extends from the right arm 403 and couples to the main flexure body 311 at a right side thereof. When a rotate torque happens, the first support portion 402 will rotate against the second dimple 320. This support structure can stiffen the soft PZT mounting region 128' and prevent the deformation of the tongue region of the flexure 307 during the manufacturing process, such as, the ultrasonic cleaning process, the PZT attachment process or any shock or vibration event happen.

Figure 5:
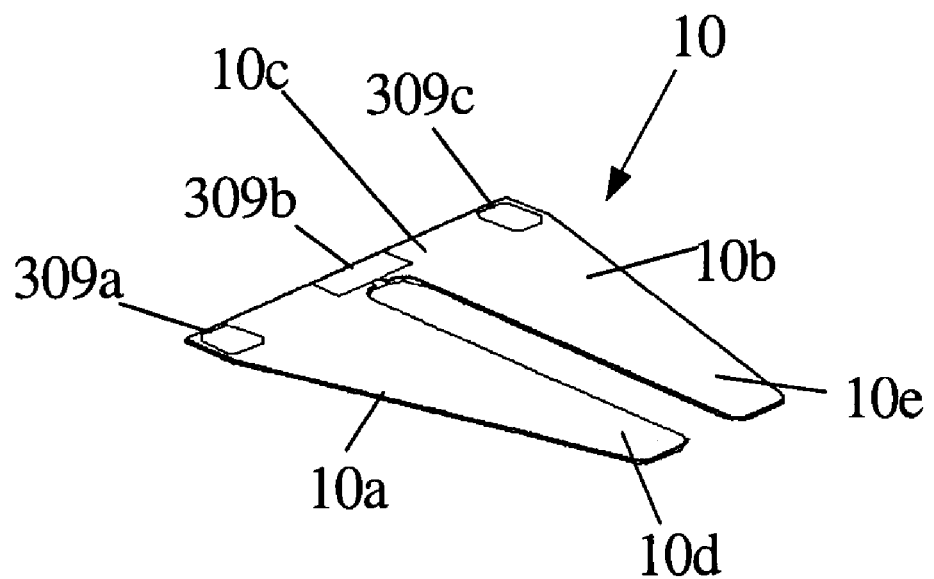
FIG. 5 is a perspective view of PZT elements for the HGA.

Referring to FIG. 5, the PZT elements 10 have a free end 10d, 10e respectively and a common end 10c, which has a plurality of electrical pads 309a, 309b and 309c thereon. The pad 109c is a common ground.

Figure 4A:
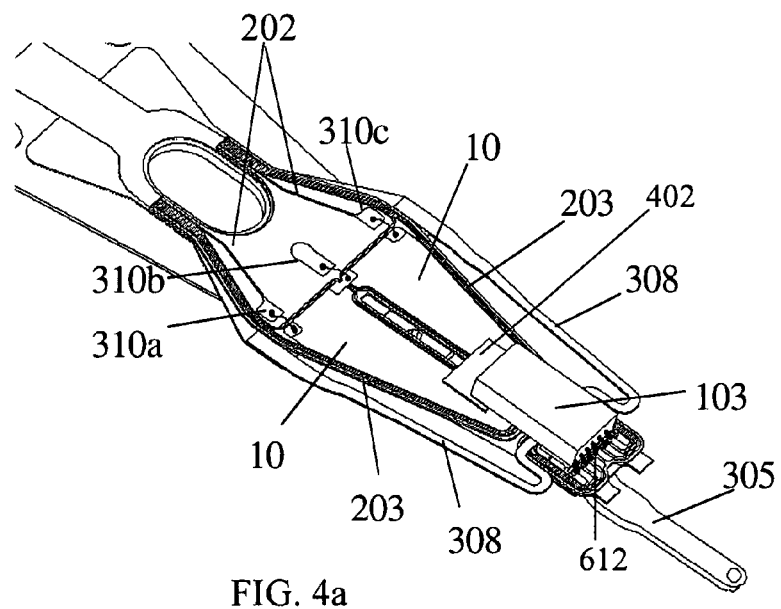
Figure 4B:
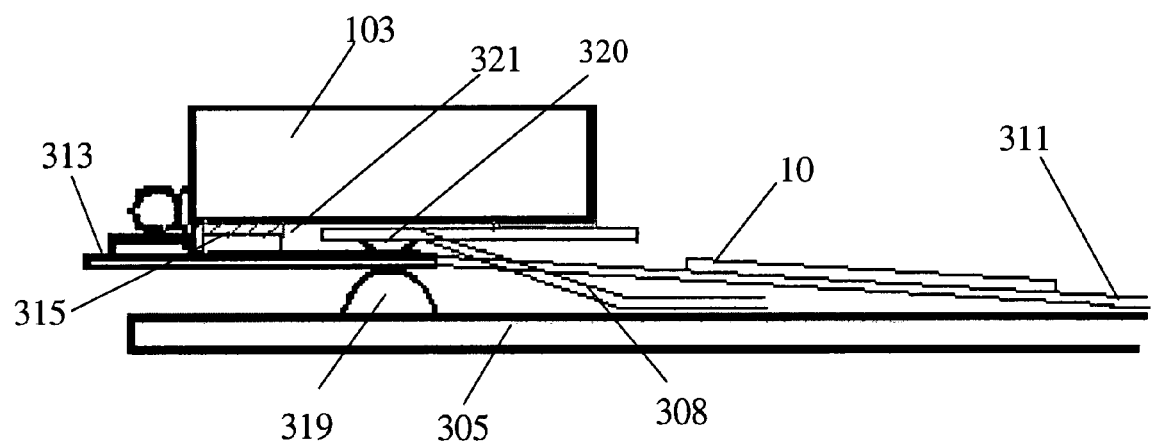

FIG. 4a is a detailed perspective view of the tongue region of the HGA according to the present invention. FIG. 4b is a partial side elevational view of the HGA of FIG. 4a. Referring to FIGS. 4a-4b, the flexure 307 further has a plurality of electrical pads 310a, 310b, 310c corresponding to the respective pads 309a, 309b, 309c of the PZT elements 10. The electrical bonding methods, such as soldering or wire bonding or other suitable method, are used for the electrical connection between the flexure 307 and the PZT elements 10. There are two sets of electrical traces 202, 203 on the flexure 307 of the suspension 300. One end of the trace 202/203 connects with the electrical pads 309a, 309b, 309c of the PZT elements 10 and the slider pads 612 of the slider 103 respectively, and the other end connects with the control system though the suspension pads 318. Thus the control system can respectively control the slider 103 and the PZT elements 10 through the traces 202, 203.

Referring to FIG. 4b, the load beam 305 forms a first dimple 319 thereon, which works with the second dimple 320 formed on the out rigger 308. The two dimples 319 and 320 sandwiches the neck portion 411 of the flexure 307. The trailing edge of the slider 103 is mounted onto the bottom end 315 of the first flexure part 313, and the leading edge of the slider 103 is supported on the rigger support portion of the out rigger 308. There is a space 321 between the slider 103 and the tongue region so that the slider 103 can rotate against the two dimples 319, 320 freely when the PZT elements 10 are driven. The first dimple 319 of the load beam 305 and the second dimple 320 of the out rigger 308 sandwiches the neck portion 411 of the flexure 307, which keeps the loading force always applying to the center of the slider 103.

Figure 3C:
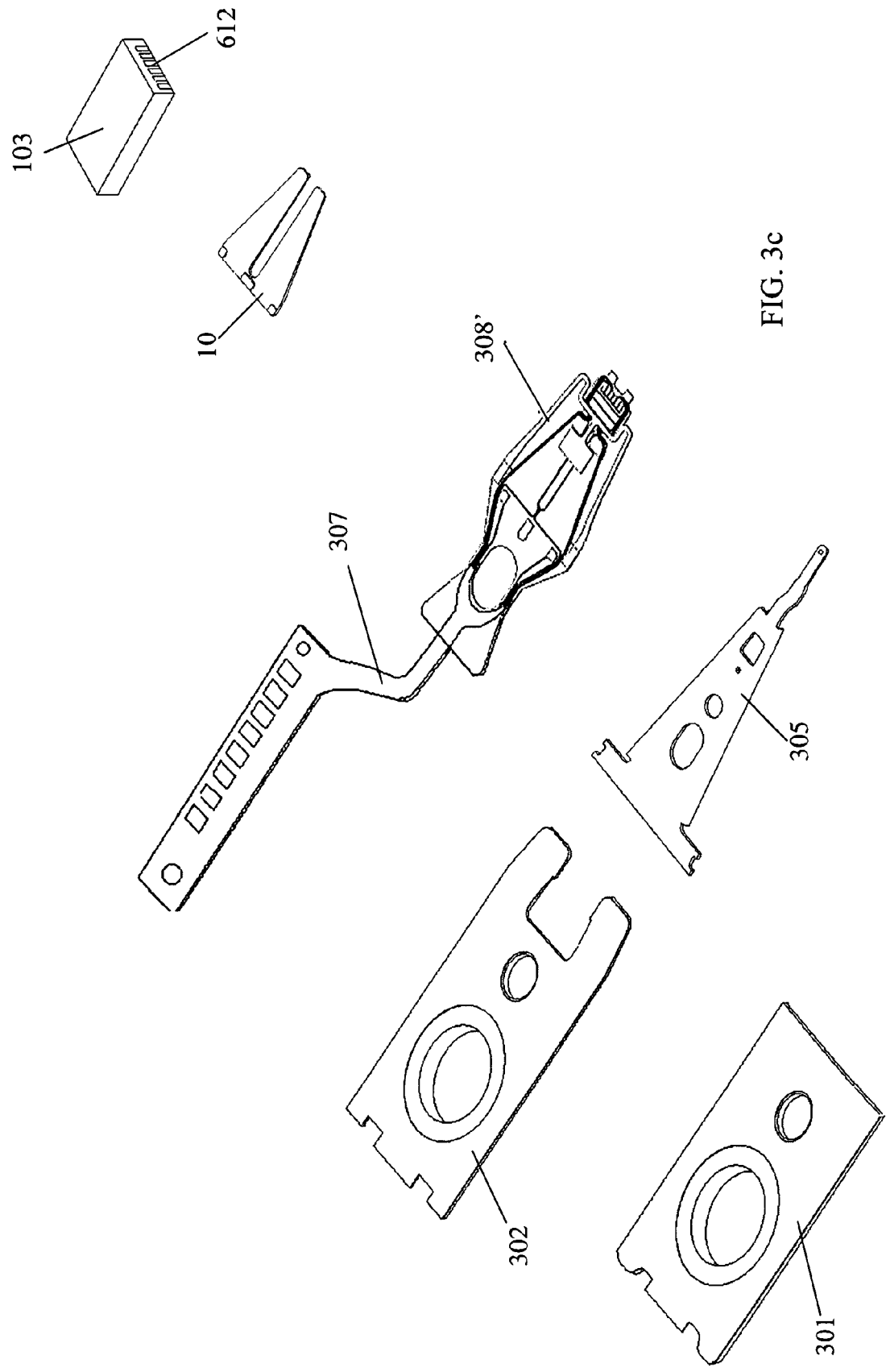
FIG. 3c is an exploded, perspective view of a HGA with a PZT micro-actuator according to a second embodiment of the present invention.

As shown in FIG. 3c, the out rigger 308' is integrally formed with the suspension flexure 307 according to a second embodiment of the present invention. The integration of the out rigger 308' and the flexure 307 can reduce the lead time and the cost for the manufacture of the suspension.

Figure 7A:
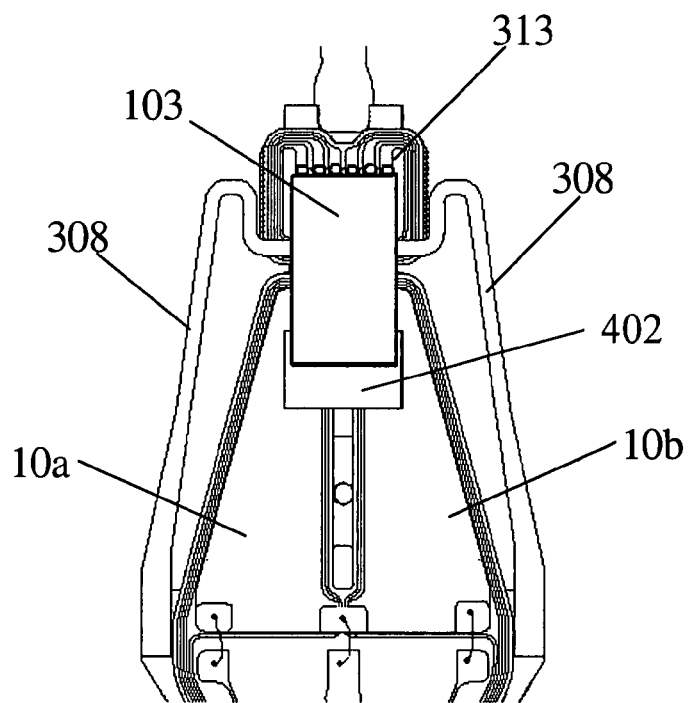
FIG. 7a is a partial top plan view of the HGA in its tongue region.
Figure 7B:
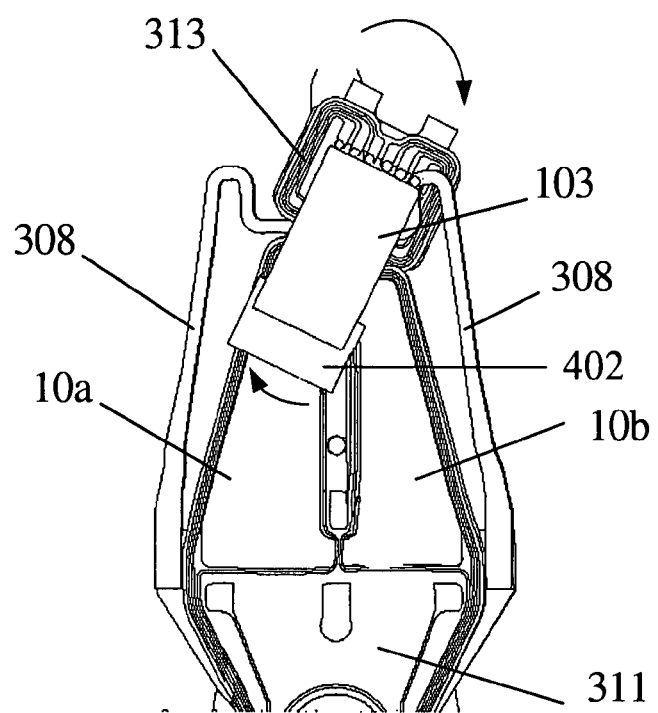
FIG. 7b is a partial top plan view of the HGA in its tongue region showing how the PZT micro-actuator works when a voltage is input thereto.

Referring to FIGS. 7a-7b, FIG. 7b illustrates how PZT micro-actuator works. When a voltage is input to the PZT elements 10, one PZT element 10a extends and the other PZT element 10b contracts, which will generate a rotation torque to cause the first flexure part 313 rotate against the neck portion 411. Since the slider 103 is partially supported on the rigger support portion of the out rigger 308 in its leading edge and partially mounted on the first flexure part 313 of the flexure 307 in its trailing edge, and the neck portion 411 is sandwiched between the first dimple 319 of the load beam 305 and the second dimple 320 of the out rigger 308, the rigger support portion and the slider is forced to rotate against the dimples 319, 320.

Figure 8A:
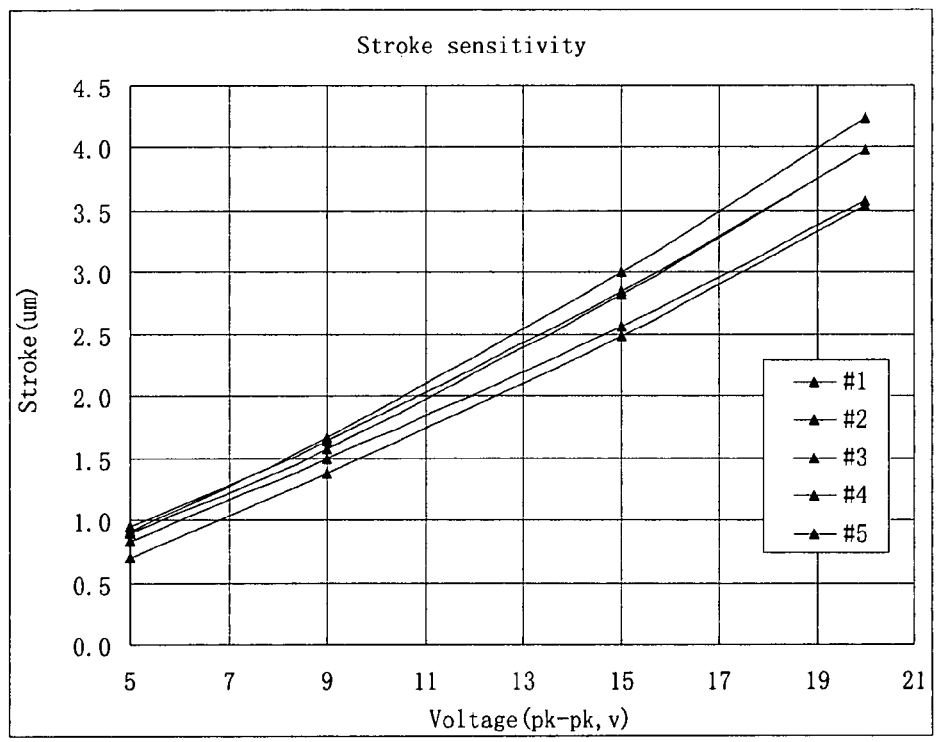
FIG. 8a shows testing data of the stroke sensitivity of the micro-actuator in the present invention.
Figure 8B:
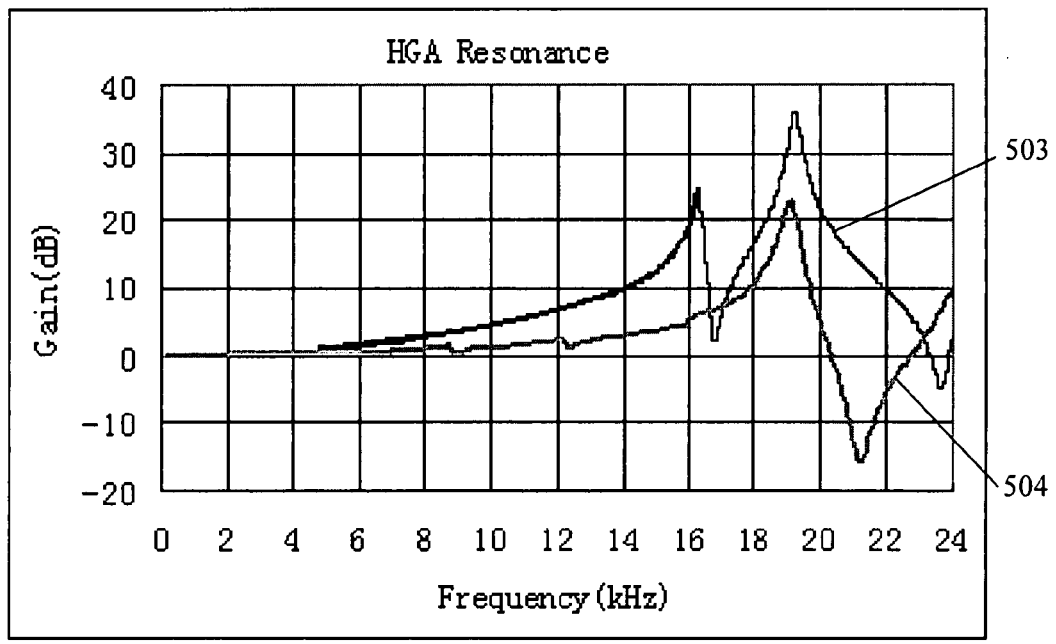
FIG. 8b shows testing data of the resonance gain of the micro-actuator in the present invention.

FIGS. 8a-8b illustrate testing data of the HGA of the present invention. FIG. 8a shows testing data of the stroke sensitivity of the micro-actuator in the present invention. As shown in FIG. 8a, the stroke sensitivity is around 170 nm per voltage. This indicates that the HGA with the micro-actuator according to the present invention is eligible to be applied to disk drive unit. FIG. 8b shows testing data of the resonance gain of the micro-actuator in the present invention. The curve 503 illustrates the resonance gain when the suspension base plate is shaken or excited, and the curve 504 shows the resonance gain when the PZT elements 10 are excited. We can see, the two curves 503 and 504 are not similar, that is, the PZT elements 10 do not have a suspension resonance. Thus, the performance characteristics of the disk drive unit is improved.

Figure 9A:
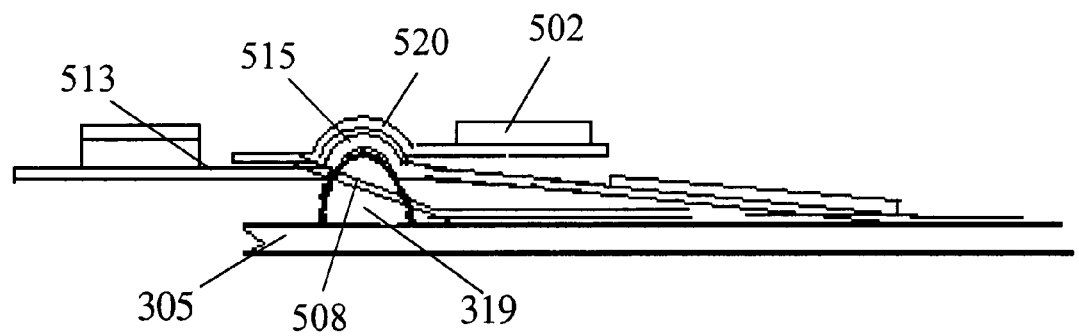
FIG. 9a is a partial side elevational view of a HGA with a PZT micro-actuator according to a third embodiment of the present invention.
Figure 9B:
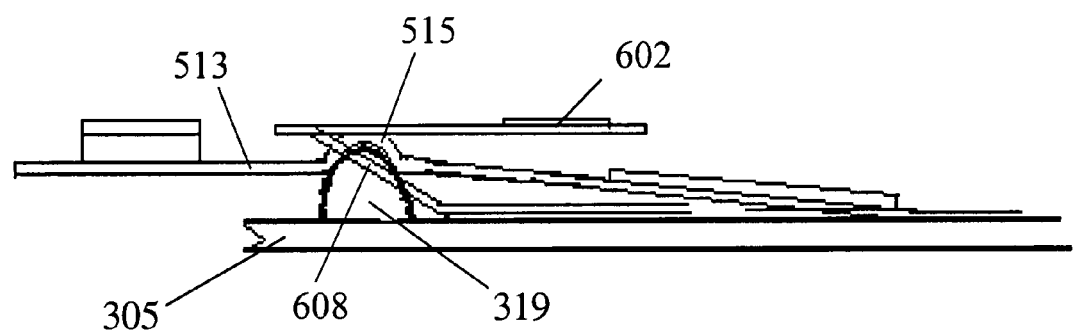
FIG. 9b is a partial side elevational view of a HGA with a PZT micro-actuator according to a fourth embodiment of the present invention.
Figure 9C:
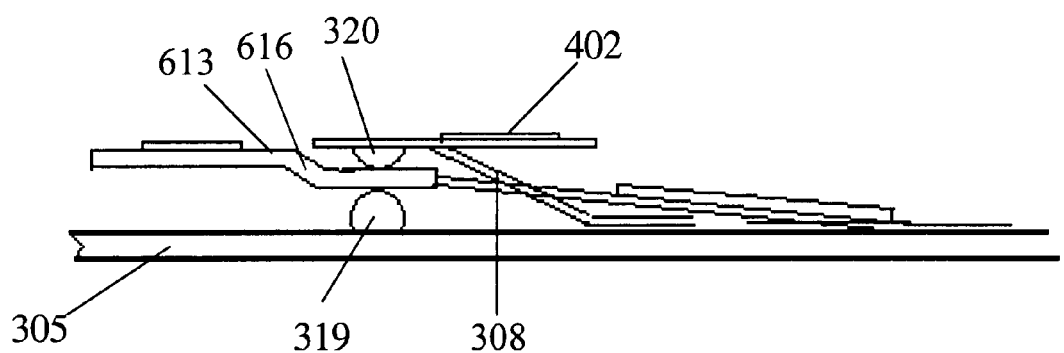
FIG. 9c is a partial side elevational view of a HGA with a PZT micro-actuator according to a fifth embodiment of the present invention.

FIGS. 9a-9c show some other embodiments of the present invention. In FIG. 9a, the first flexure part 513 and the rigger support portion 502 of the out rigger 508 each form a dimple 515, 520 which both are laminated on the first dimple 319 of the load beam 305 so that the first flexure part 513, the rigger support portion 502 and the slider 103 (not shown) rotate against the dimples 319, 515, 520 when the PZT micro-actuator is excited. As shown in FIG. 9b, the rigger support portion 602 of the out rigger 608 with no dimple is supported on the dimple 515 which functions similarly as the second dimple 320. As shown in FIG. 9c, the first flexure part 613 forms a step 616 to keep a height difference between the first flexure part 613 and the rigger support portion 402, which maintenances a good static angle of the slider 103 in both pitch and roll direction.

Figure 10A:
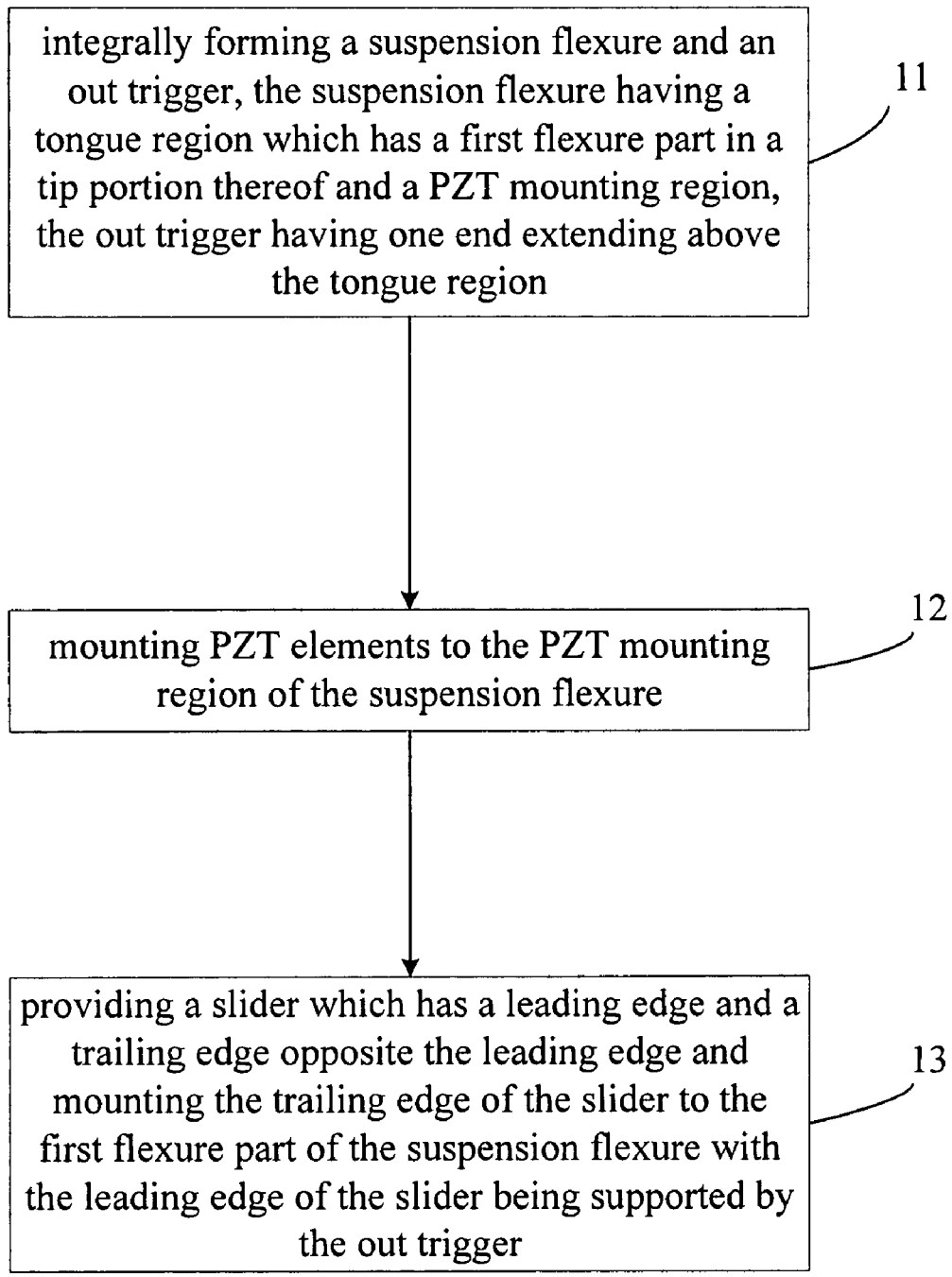
FIG. 10a is a flow chart illustrating a manufacturing method of the HGA according to an embodiment of the present invention.

FIG. 10a illustrates the primary steps involved in the manufacturing process of the HGA according to an embodiment of the present invention, which includes the steps of: 11) integrally forming a suspension flexure and an out rigger, the suspension flexure having a tongue region which has a first flexure part in a tip portion thereof and a PZT mounting region, the out rigger having one end extending above the tongue region; 12) mounting PZT elements to the PZT mounting region of the suspension flexure; 13) providing a slider which has a leading edge and a trailing edge opposite the leading edge and mounting the trailing edge of the slider to the first flexure part of the suspension flexure with the leading edge of the slider being supported by the out rigger.

Figure 10B:
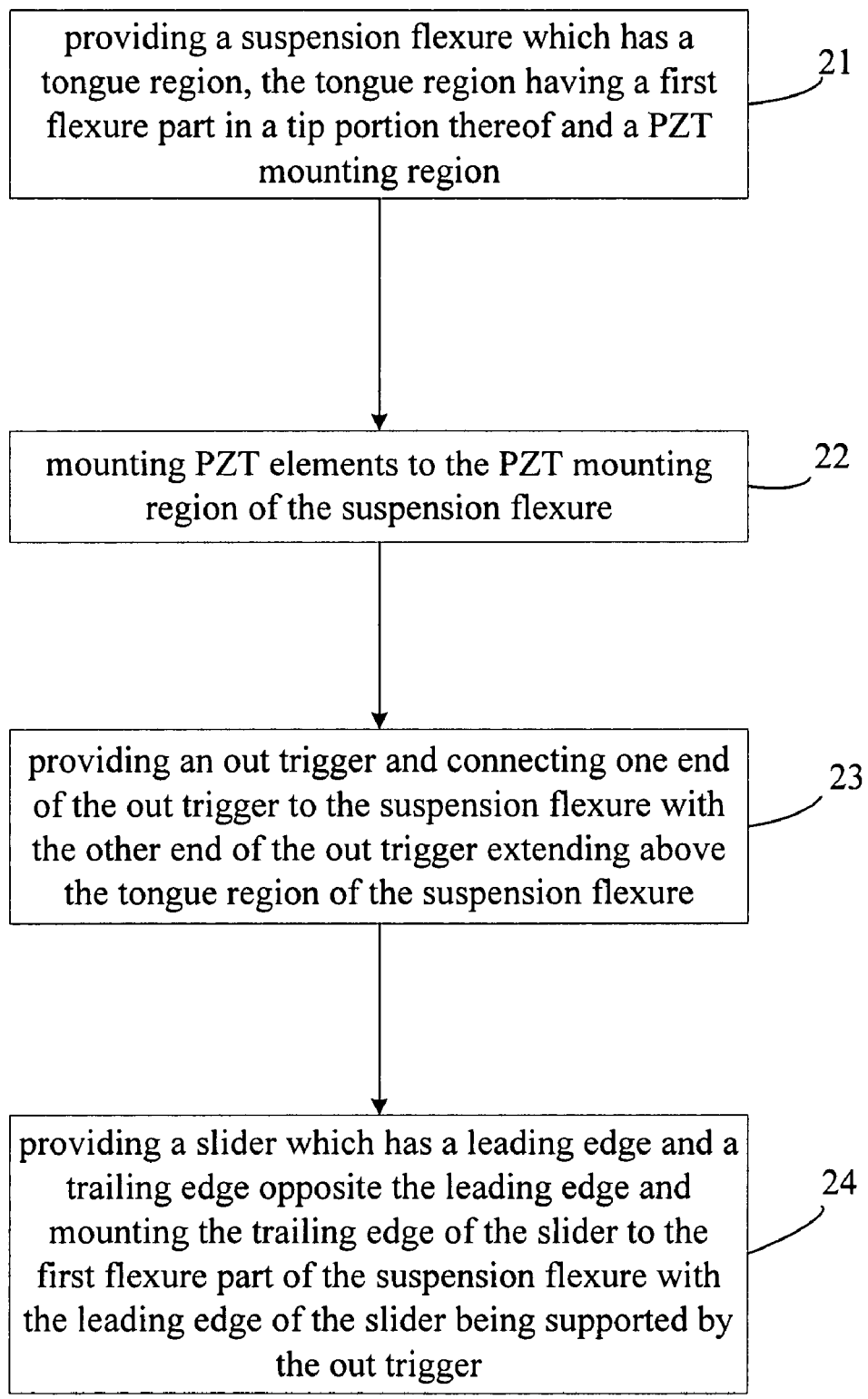
FIG. 10b is a flow chart illustrating a manufacturing method of the HGA according to another embodiment of the present invention.

FIG. 10b illustrates the primary steps involved in the manufacturing process of the HGA according to another embodiment of the present invention, which includes the steps of: 21) providing a suspension flexure which has a tongue region, the tongue region having a first flexure part in a tip portion thereof and a PZT mounting region; 22) mounting PZT elements to the PZT mounting region of the suspension flexure; 23) providing an out rigger and connecting one end of the out rigger to the suspension flexure with the other end of the out rigger extending above the tongue region of the suspension flexure; 24) providing a slider which has a leading edge and a trailing edge opposite the leading edge and mounting the trailing edge of the slider to the first flexure part of the suspension flexure with the leading edge of the slider being supported by the out rigger.

Preferably, the out rigger is shaped by chemical etching process.

Figure 11:
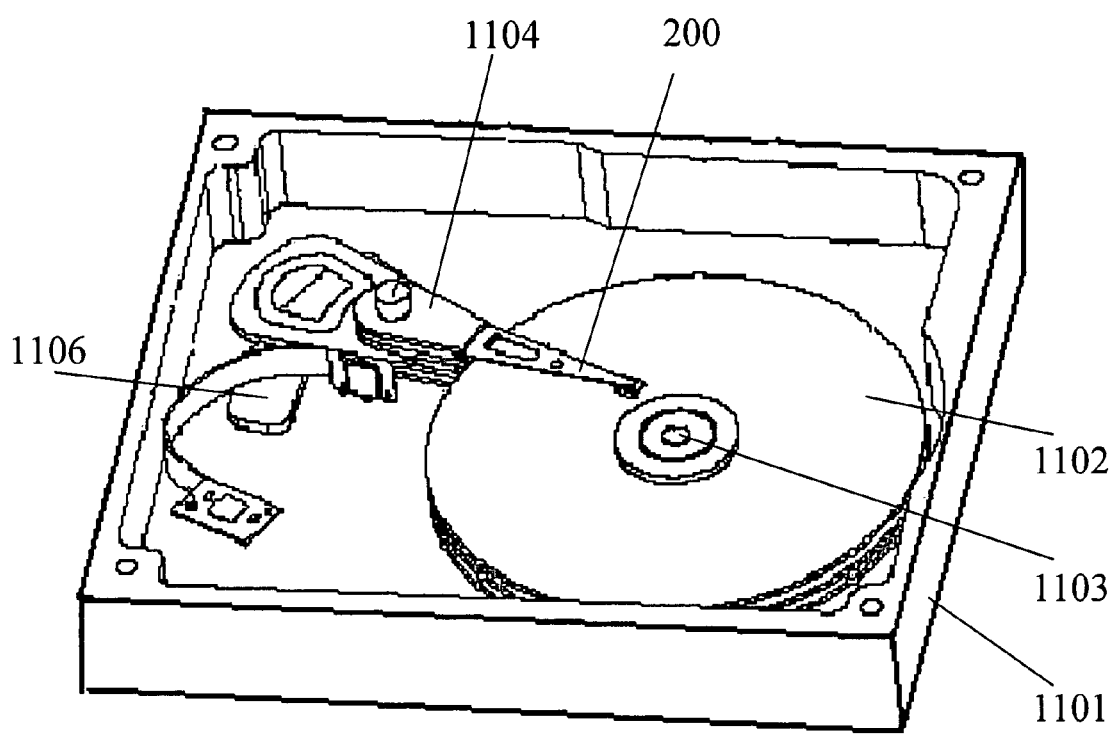
FIG. 11 is a perspective view of a disk drive unit according to the present invention.

Referring to FIG. 11, according to an embodiment of the present invention, a disk drive unit can be attained by assembling a housing 1101, a disk 1102, a spindle motor 1103 for spinning the disk 1102, a voice coil motor 1106, and a drive arm 1104 with the HGA 200 of the present invention. Because the structure and the assembly process of disk drive unit are well known to persons ordinarily skilled in the art, a detailed description of such structure and assembly is omitted herefrom.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A suspension for a head gimbal assembly comprising:
    a suspension flexure, the suspension flexure having a tongue region, the tongue region having a first flexure part in a tip portion thereof adapted for mounting a trailing edge of a slider and a PZT mounting region adapted for mounting PZT elements; and
    an out rigger, one end of the out rigger being connected to the suspension flexure, and the other end of the out rigger having a rigger support portion which extends above the tongue region so as to be adapted for supporting a leading edge of the slider,
    wherein the rigger support portion has a first support portion corresponding to a center portion of the slider, a second support portion corresponding to the leading edge of the slider, and a weak beam coupling the first and the second support portions.

2. The suspension as claimed in claim 1, wherein the out rigger is integrally formed with the suspension flexure.

3. The suspension as claimed in claim 1, wherein the tongue region further has a neck portion coupling the first flexure part and the PZT mounting region so that the first flexure part is rotated against the neck portion.

4. The suspension as claimed in claim 3, wherein between the neck portion and the rigger support portion there is a second dimple to support the rigger support portion such that the rigger support portion is rotated against the second dimple.

5. The suspension as claimed in claim 4, wherein the second dimple is formed on the rigger support portion, the suspension further comprises a load beam, the load beam provides a first dimple, the first dimple and the second dimple sandwich the neck portion.

6. The suspension as claimed in claim 4, wherein the second dimple is formed on the neck portion, the suspension further comprises a load beam, the load beam provides a first dimple, the second dimple is laminated on the first dimple.

7. The suspension as claimed in claim 3, further comprising a load beam, wherein the load beam provides a first dimple, the neck portion and the rigger support portion both form a dimple which both are laminated on the first dimple so that the first flexure part and the rigger support portion are rotated against the dimples.

8. The suspension as claimed in claim 1, wherein the first flexure part forms a step to keep a height difference between the first flexure part and the rigger support portion.

9. The suspension as claimed in claim 1, wherein the first support portion comprises a left arm and a right arm, the out rigger further has a left beam extending from the left arm to connect to the suspension flexure and a right beam extending from the right arm to connect to the suspension flexure.

10. The suspension as claimed in claim 1, wherein the out rigger is metal material.

11. A head gimbal assembly for a disk drive unit comprising:
    a slider having a leading edge and a trailing edge opposite the leading edge;
    a micro-actuator having PZT elements; and
    a suspension comprising a suspension flexure, the suspension flexure having a tongue region, the tongue region having a first flexure part in a tip portion thereof for mounting the trailing edge of the slider and a PZT mounting region for mounting the PZT elements; and
    an out rigger, one end of the out rigger being connected to the suspension flexure, and the other end of the out rigger having a rigger support portion which extends above the tongue region so as to support the leading edge of the slider,
    wherein the rigger support portion has a first support portion corresponding to a center portion of the slider, a second support portion corresponding to the leading edge of the slider, and a weak beam coupling the first and the second support portions.

12. The head gimbal assembly as claimed in claim 11, wherein the tongue region further has a neck portion coupling the first flexure part and the PZT mounting region so that the first flexure part is rotated against the neck portion.

13. The head gimbal assembly as claimed in claim 12, wherein between the neck portion and the rigger support portion there is a second dimple to support the rigger support portion such that the rigger support portion is rotated against the second dimple.

14. The head gimbal assembly as claimed in claim 13, wherein the second dimple is formed on the rigger support portion, the suspension further comprises a load beam, the load beam provides a first dimple, the first dimple and the second dimple sandwich the neck portion.

15. The head gimbal assembly as claimed in claim 13, wherein the second dimple is formed on the neck portion, the suspension further comprises a load beam, the load beam provides a first dimple, the second dimple is laminated on the first dimple.

16. The head gimbal assembly as claimed in claim 12, wherein the suspension further comprises a load beam, the load beam provides a first dimple, the neck portion and the rigger support portion both form a dimple which both are laminated on the first dimple so that the first flexure part, the rigger support portion and the slider are rotated against the dimples.

17. The head gimbal assembly as claimed in claim 11, wherein the first flexure part forms a step to keep a height difference between the first flexure part and the rigger support portion.

18. The head gimbal assembly as claimed in claim 11, wherein the first support portion comprises a left arm and a right arm, the out rigger further has a left beam extending from the left arm to connect to the suspension flexure and a right beam extending from the right arm to connect to the suspension flexure.

19. The head gimbal assembly as claimed in claim 11, wherein the out rigger is integrally formed with the suspension flexure.

20. The head gimbal assembly as claimed in claim 11, wherein the out rigger is formed of metal material.

21. A method for manufacturing a head gimbal assembly comprising:
  providing a suspension flexure which has a tongue region, the tongue region having a first flexure part in a tip portion thereof and a PZT mounting region;
  mounting PZT elements to the PZT mounting region of the suspension flexure;
  providing an out rigger and connecting one end of the out rigger to the suspension flexure with the other end of the out rigger extending above the tongue region of the suspension flexure; and
  providing a slider which has a leading edge and a trailing edge opposite the leading edge and mounting the trailing edge of the slider to the first flexure part of the suspension flexure with the leading edge of the slider being supported by the out rigger,
  wherein the rigger support portion has a first support portion corresponding to a center portion of the slider, a second support portion corresponding to the leading edge of the slider, and a weak beam coupling the first and the second support portions.

22. A method for manufacturing a head gimbal assembly comprising:
  integrally forming a suspension flexure and an out rigger, the suspension flexure having a tongue region which has a first flexure part in a tip portion thereof and a PZT mounting region, the out rigger having one end extending above the tongue region;
  mounting PZT elements to the PZT mounting region of the suspension flexure; and
  providing a slider which has a leading edge and a trailing edge opposite the leading edge and mounting the trailing edge of the slider to the first flexure part of the suspension flexure with the leading edge of the slider being supported by the out rigger,
  wherein the rigger support portion has a first support portion corresponding to a center portion of the slider, a second support portion corresponding to the leading edge of the slider, and a weak beam coupling the first and the second support portions.

23. A disk drive unit comprising:
  a head gimbal assembly;
  a drive arm to connect with the head gimbal assembly;
  a disk; and
  a spindle motor to spin the disk;
  wherein the head gimbal assembly comprises:
  a slider having a leading edge and a trailing edge opposite the leading edge;
  a micro-actuator having PZT elements; and
  a suspension comprising a suspension flexure, the suspension flexure having a tongue region, the tongue region having a first flexure part in a tip portion thereof for mounting the trailing edge of the slider and a PZT mounting region for mounting the PZT elements; and
  an out rigger, one end of the out rigger being connected to the suspension flexure, and the other end of the out rigger having a rigger support portion which extends above the tongue region so as to support the leading edge of the slider,
  wherein the rigger support portion has a first support portion corresponding to a center portion of the slider, a second support portion corresponding to the leading edge of the slider, and a weak beam coupling the first and the second support portions.

24. The disk drive unit as claimed in claim 23, wherein the first support portion comprises a left arm and a right arm, the out rigger further has a left beam extending from the left arm to connect to the suspension flexure and a right beam extending from the right arm to connect to the suspension flexure.

* * * * *